Sept. 12, 1950     L. JENSEN, SR., ET AL     2,522,179
FISHING PLUG
Filed Jan. 20, 1948
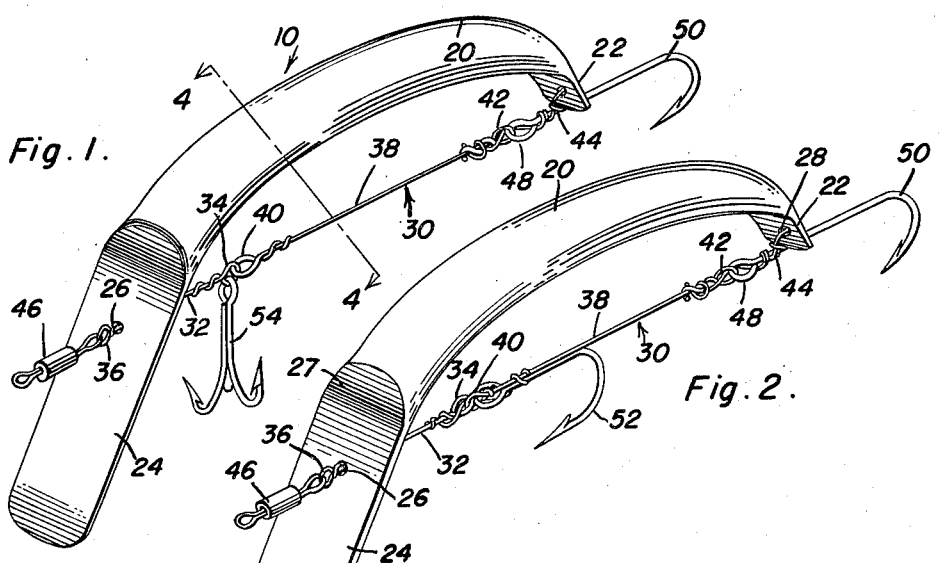
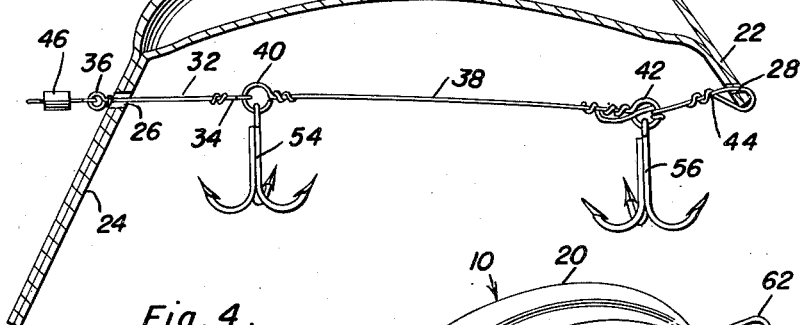
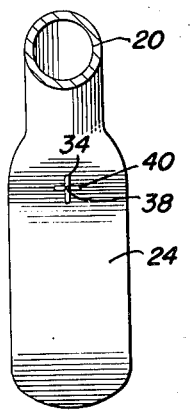
Luhr Jensen, Sr.
Luhr Jensen, Jr.
          INVENTOR.S
BY *Clarence A. O'Brien*
and *Harvey B. Jacobson*
          Attorneys Patented Sept. 12, 1950

2,522,179

UNITED STATES PATENT OFFICE 2,522,179

FISHING PLUG

Luhr Jensen, Sr., and Luhr Jensen, Jr.,
Hood River, Oreg.

Application January 20, 1948, Serial No. 3,204

2 Claims. (Cl. 43—42.35)

This invention relates to a fishing device and more particularly to an improvement in fishing plugs, of the type designed and adapted to float or be moved on the water adjacent the surface thereof.

The principal object of this invention is to provide a new and novel fishing plug, which is durably and economically manufactured and which is convenient, reliable and durable in use.

Another object of this invention is to control the movement of the fishing plug in the water, so that a wobbly or bobbing movement is obtained, and also a snake-like or serpentine movement is imparted to the fishing plug.

Another object of this invention is to control and adjust the wobbling or axial movement of the fishing plug, so that various types of wobbling movements may be obtained, and also to control the angular movement or wavy movement of the fishing plug, so that various serpentine or wavy motions may be imparted to the fishing plug.

Another object of this invention to be specifically herein enumerated is to provide a fishing plug that is composed of relatively few parts, with no relative movement existing between the parts, so that an efficient and durable fishing plug is obtained.

A meritorious feature of this invention resides in the provision of a tubular buoyant fishing plug, having an adjustable and movable front section, which controls the wobbling and serpentine movement of the plug in the water.

Another meritorious feature of this invention resides in the provision of a wire hook and line receiving member, which is inserted through the front and tail sections of the fishing plug, so that the strain of the weight of the fish on the hooks is borne solely by the fishing line.

These and ancillary objects and other meritorious features are obtained by this invention, preferred embodiments of which are set forth in the following description and illustrated in the accompanying drawings, wherein:

Figure 1 is a perspective view of a fishing plug, constructed in accordance with the principles of this invention;

Figure 2 is a perspective view of a modified form of this invention;

Figure 3 is a vertical longitudinal sectional view of a modified fishing plug, showing the hook and line attaching member in elevation and secured thereto;

Figure 4 is a cross-sectional view taken substantially on the plane of line 4—4 of Figure 1 with the hooks removed, and;

Figure 5 is a view in perspective of another embodiment of this invention.

Referring now more particularly to the drawings, wherein similar characters of reference designate similar parts throughout, and with particular reference to Figures 1 and 3 thereof, there is shown a fishing plug, generally denoted by the character reference 10, which is constructed according to the principles of this invention. The fishing plug 10 is formed of a hollow, tubular buoyant material, such as aluminum, plastic tubing, or cellulose nitrate, ethyl cellulose or other moldable material insoluble in water. It comprises an elongated, tubular arcuate body section 20, having formed at one end thereof a substantially flat tail portion 22. The tail portion 22 is in angular relation to the arcuate body section 20 and is formed by angularly bending the hollow tube 10 and pinching an end portion thereof.

Integrally formed at the opposite end of the body section 20 and extending therefrom is a substantially flat, rectangular front portion or section 24. The front portion 24 is offset from the arcuate body section 20, being formed by pressing the tubular side walls of the tube 20 together, similar to the formation of the tail section 22. The bottom wall of the rectangular front section 24 is in angular relation to the bottom wall of the body section 20, while the top wall of the rectangular, offset front portion 24 has an upstanding shoulder 27 formed at the angular junction of the upper mobile wall of the body section 20 and the top wall of the section 24.

Constructed and arranged in horizontal alignment in the front and tail assemblies, 24 and 22, respectively, are apertures 26 and 28, of a suitable diameter to receive therethrough a wire line and hook receiving member, generally denoted by the character reference 30.

Referring now particularly to the main portion of the plug, comprising the body section 20, and the offset tail and front sections 22 and 24, it is to be noted that the front portion 24 is movable about the angular junction with the body section 20 and the placement or positioning of the front section 24 relative to the body section is the controlling medium by which the wobbling and serpentine action or movement of the fishing plug is controlled in the water. With reference to the drawing, it is to be noted that, by manually bending the section 24 up and down, the tail assembly 22 will describe a larger or smaller, arcuate wobbling movement or chopping movement through the water, as the fishing plug is pulled or trolled along or under the surface thereof.

Also, by twisting the front section 24 relative to the body section 20, the wavy or serpentine movement of the fishing plug may be adjusted and controlled.

Suitable means are provided, whereby hooks and a line may be attached to the fishing plug, in such a fashion that the weight of the fish on the hooks and on the line is borne directly by the line. The means preferred comprises a wire, of suitable diameter and of durable strength, dependent upon the type of fish and the size of the fishing plug. The wire 32 has formed at its opposing ends closed loops or ring portions 34 and 36, which are formed by twisting the ends of the wire 32 around the body or shank section thereof. The ring portion 36 of the wire 32, is positioned in front of the front portion 24 and the loop 34 of the wire 32 extends rearwardly thereof. Inserted in the ring 34 is an intermediate connecting member 38 which is secured within the ring 34, by bending a portion of its end back and twisting the same around the body or shank section thereof, forming a closed ring 40, which is linked with the ring 34. The opposite end of the intermediate wire 38 is formed in a similar manner, defining a ring or eye portion 42, within which is inserted and on which is suitably twisted an attaching wire 44, having its opposite end inserted through the aperture 28 at the tail section 22 and suitably twisted around the bottom portion of the tail 22 so as to be secured thereto. Thus, it can be seen that there is provided a line receiving and hook supporting wire 30, which extends in horizontal alignment through the front portion 24 and the tail portion 22 of the fishing plug. Inserted within the eye or ring 36 which projects forwardly of the front portion 24, is a line receiving barrel swivel eye 46.

Attention is directed now to Fig. 2 in which we see disposed within the ring or eye 42 of the intermediate wire 38 a rigid hook 50, which is retained or held against axial movement by twisting the tail section wire 44 around the connecting end 48 thereof. Likewise secured and made rigid within the opposite eye or ring 40 of the line 48 is a rigid complementary hook 52.

Referring now to the modification illustrated in Figure 3 of the drawings, the rigid hooks 50 and 52 are dispensed with and in their place, suitably supported within the opposing eyes or rings 40 and 42 of the intermediate line 38, are a pair of hooks 54 and 56 respectively.

With reference to the modification disclosed in Figure 5 of the drawings, there is shown a similar fishing plug, constructed in accordance with the above noted description, but of a smaller size, for accommodating smaller fish, and wherein the barrel swivel 46 is dispensed with and a rigid connecting wire 60, is secured to the projecting eye or ring 36 of the wire 32, so that the swivelling of the fishing plug is retarded or prevented. As can be seen, this fishing plug is designed for use in luring smaller fish and only one hook, 62, is provided, which is secured to the fishing plug, in a like manner as that of hook 50, described above.

Thus, it can be seen that there is provided a novel fishing hook, whereby with a single and convenient adjustment to the front section, relative to the body section, the wobbling or bobbing movement of the fishing plug may be adjusted and controlled, which presents a desirable feature,
in that certain fish are attracted by various movements, some types being attracted by an extended arcuate wobbling movement, while others are attracted by a slow wobbling movement. Also, the serpentine or snake-like movement of the fishing plug may be controlled by the front section. It is apparent that with the front section moved up, down or twisted relative to the body section, the movement of the fishing plug through the water with the water hitting the protruding front section, will cause various movements of the body section, depending upon the angular positioning and the twist imparted to the front section.

Since many other modifications and purposes of this invention will become apparent to those skilled in the art, upon a perusal of the foregoing description, in view of the accompanying drawings, it is to be understood that certain changes in size, style and arrangement of parts may be effected, without a departure from the spirit of the invention and within the scope of the appended claims.

Having described the invention what is claimed as new is:

1. A fishing plug comprising an arcuate hollow, elongated, tubular body which is circular in cross-section and has an upper and a lower wall, said walls being pressed together at the opposite ends of the body to form opposed flattened ends, said ends being bent angularly from the body and diverging laterally therefrom and formed with longitudinally aligned apertures, connecting members extending through the apertures and secured to the ends and to each other, said connecting members being spaced from the lower wall of the body and means formed in said members for supporting hook members.

2. A fishing plug comprising an arcuate elongated, buoyant, tubular body which is circular in cross-section and is formed with opposing flattened ends, said ends being bent angularly of the body and diverging outwardly therefrom in the same direction and having longitudinally aligned openings therein, connecting members disposed through the openings and secured to said ends, means formed on said members for swivelly supporting hook members, one of said ends being longer than the other and being malleable for controlling the movement of the plug in the water.

LUHR JENSEN, Sr.
LUHR JENSEN, Jr.

REFERENCES CITED

The following references are of record in the file of this patent:

UNITED STATES PATENTS

| Number | Name | Date |
| --- | --- | --- |
| 766,638 | Martin | Aug. 2, 1904 |
| 1,777,004 | Lemere et al. | Sept. 30, 1930 |
| 2,066,458 | DeWitt | Jan. 5, 1937 |
| 2,183,849 | Swanberg | Dec. 19, 1939 |
| 2,288,009 | Matasy et al. | June 20, 1942 |
| 2,290,433 | Jeffers | July 21, 1942 |

FOREIGN PATENTS

| Number | Country | Date |
| --- | --- | --- |
| 4,134 | Great Britain | 1905 |
| 393,514 | Great Britain | June 8, 1933 |